United States Patent Office 3,539,579
Patented Nov. 10, 1970

3,539,579
1 - (3 - CYANO - 3,3 - DIPHENYL - PROPYL) - 4-
PHENYL - PIPERIDINE - 4 - CARBOXYLIC
ACID ESTERS
Paul Adriaan Jan Janssen, Vosselaar, Belgium, assignor to
Janssen Pharmaceutica, a corporation of Belgium
No Drawing. Filed Nov. 22, 1967, Ser. No. 684,964
Int. Cl. C07d 29/24
U.S. Cl. 260—294.3
11 Claims

ABSTRACT OF THE DISCLOSURE

The invention includes (A) compounds of the class of 1 - (3 - cyano-3,3-diphenylpropyl)-4-phenyl-piperidine-4-carboxylic acid esters in which the ester function contains at least one ether function, which compounds are useful as anti-diarrheal agents; and (B) compounds of the class of 4-phenyl-piperidine-4-carboxylic acid esters in which the ester function also contains said ether function, which compounds are useful as intermediates in the preparation of compounds (A).

---

The present invention relates to certain novel esters of 1 - (3-cyano-3,3-diphenyl-propyl)-4-phenyl-piperidine-4-carboxylic acid having the structural formula:

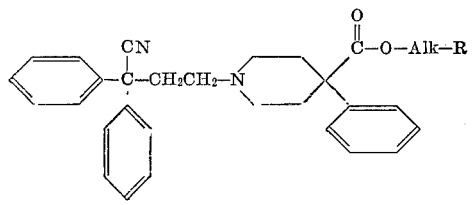

(I)

wherein Alk represents an alkylene chain of from 1 to 5 carbon atoms, and R represents a member selected from the group consisting of lower alkyloxy; lower alkenyloxy, e.g., allyloxy, butenyloxy, methallyloxy, pentenyloxy and the like; lower alkyloxy-lower alkyloxy; cycloalkyloxy, e.g., cyclopentoxy, cyclohexoxy and the like; tetrahydrofuryl; phenoxy; halophenoxy; tolyloxy; xylyloxy; lower alkoxyphenoxy, preferably methoxyphenoxy; and naphthyloxy. The therapeutically active acid addition salts of the foregoing compounds are also included within the scope of the present invention.

In contrast to other esters disclosed in the prior art, e.g., see U.S. Pat. No. 2,898,340, the ester function of the subject compounds contains at least one ether function.

The compounds of Formula I are conveniently prepared by the condensation of an appropriate 2,2-diphenyl-4-X-butyronitrile (II), for example, the 4-halo derivative, with an appropriate ester of 4-phenyl-piperidine-4-carboxylic acid (III) which may be advantageously used in the form of its acid addition salt, such as, for example, a hydrohalide. Said esters of Formula III, as well as the acid addition salts thereof, are novel compounds and, as such, constitute an additional part of this invention. The condensation reaction can be carried out in such organic solvents as the aromatic hydrocarbons, e.g., benzene, toluene, xylene and the like, lower alkanols and lower alkanones. Since in the condensation an equivalent of acid (HX) is liberated, it is desirable to use an appropriate amount of a suitable base, e.g., an alkali metal carbonate, a trialkylamine, pyridine and the like, to combine with the acid released. The presence of catalytic amounts of potassium iodide is also desirable. The reaction scheme may be illustrated as follows:

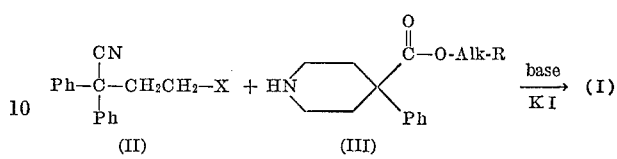

wherein Alk and R are as heretofore described, Ph is phenyl and X stands for a reactive ester of the corresponding alcohol with strong inorganic or organic acids such as hydrochloric, hydrobromic, hydriodic, sulfuric, methanesulfonic, toluenesulfonic and the like acids.

The compounds of Formula II used as starting materials are known. When X is halo, e.g., chloro or bromo, they are conveniently prepared according to the method of Dupré et al., J.C.S., 1949:505. The 4-phenyl-piperidine-4-carboxylic acid esters (III) are conveniently obtained by reacting 1 - benzyl-4-chlorocarbonyl-4-phenyl-piperidine (IV), preferably in the form of an acid addition salt such as hydrohalide, with an appropriate alcohol of Formula V in a suitable organic solvent, such as, for example, an aromatic hydrocarbon, a dialkylformamide, e.g., dimethylformamide and diethylformamide, and an ether such as tetrahydrofuran, 1,2-dimethoxyethane and the like. Elevated temperatures may be employed to enhance the rate of reaction. A base such as previously described may again be used to take up the hydrogen halide released during the reaction. Debenzylation of the thus obtained 1-benzyl-4-phenyl-piperidine-4-carboxylate (VI), for example, by means of hydrogen activated by palladium-on-charcoal catalyst, yields the corresponding compounds of Formula III.

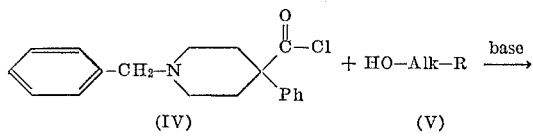

(IV)          (V)

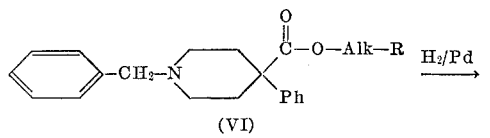

(VI)

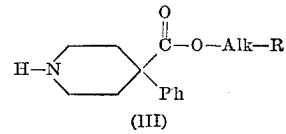

(III)

When the R function is lower alkenyloxy, reduction of the double bond may result during the debenzylation reaction, thereby making it difficult to obtain the corresponding starting material of Formula III. The preferred method, therefore, of making the subject compounds (I) wherein the R function is lower alkenyloxy is by transesterification of an alkyl 1-(3-cyano-3,3-diphenyl-propyl)-

4-phenyl-piperidine-4-carboxylate with an appropriate alcohol, i.e., HO-Alk-O-(lower alkenyl), typically, in the presence of sodium in an alcoholic solvent.

An alternative method of preparing the compounds of Formula III, preferably when R is an aryloxy group such as previously described, is by reacting 4-halocarbonyl-4-phenyl-piperidine (VII), the halo of which is preferably chloro or bromo, with an alcohol of the formula HO-Alk-R (V) in a suitable organic solvent, e.g., anhydrous toluene. The acid addition salt of (VII) may also be employed whereby the corresponding acid addition salt of (III) will be obtained.

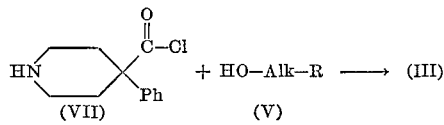

Another procedure for preparing the subject compounds (I) employs as the starting material diphenylacetonitrile which is reacted with a metallorganic reagent to form the α-metallo derivative:

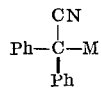

which is then condensed with a corresponding 1-halo-ethyl-piperidine derivative of the formula:

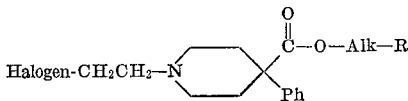

with elimination of the metal halide, M-halogen.

Still another method is to use the corresponding free acid form of (III) in lieu of the ester, typically in an alcoholic solvent in the presence of a base such as sodium carbonate, and to esterify the corresponding acid form of (I) that is produced with an appropriate alcohol (i.e., HO-Alk-R).

The compounds of Formula I, in base or salt form, are highly active inhibitors of gastro-intestinal propulsion and defecation and are therefore useful in the treatment of diarrhea. The anti-diarrheal activity of the such compounds has been observed in experimental animals, for example, according to the following test procedure. Young female Wistar rats (230–250 g. body weight) are fasted overnight and in the morning each animal is treated orally with a dose level (40, 20, 10, 5, 2.5, 1.25, 0.63 mg./kg.) of the compound to be tested (10 ml./kg.). One hour thereafter, the animal receives 1 ml. of ricinus oil orally. Each animal is kept in an individual cage. At different time intervals (1, 2, 3, 4, 6 and 8 hrs.) after the ricinus oil treatment, the presence or absence of diarrhea is noted. In more than 95% of 250 control animals, severe diarrhea is observed 1 hour after treatment with ricinus oil. Using this all-or-none criterium, a significant positive effect occurs with the tested compound if no diarrhea is observed 1 hour after the ricinus oil treatment in at least two out of ten rats per dose level [= lowest effective dose (LED) in mg./kg. orally]. A minimum of 5 dose levels are used per drug, each dose level being given to 10 rats on ten different days. For example, according to this procedure, one of the preferred compounds, 2-phenoxyethyl 1-(3-cyano - 3,3 - diphenylpropyl) - 4-phenyl-piperidine-4-carboxylate hydrochloride, has an LED of 0.16 mg./kg. orally. In the following table, the LED of several other compounds are listed, it being understood that the derivatives listed therein are not stated for purposes of limiting the invention thereto, but only to show the useful properties of compounds within the scope of the general Formula I. In view of their useful anti-diarrheal activity, the subject compounds may be formulated in various forms, e.g., liquids, powders, tablets, capsules and the like, according to conventional pharmaceutical techniques.

| —Alk— | —R | Anti-diarrheal activity LED in mg./kg. orally |
|---|---|---|
| —CH₂— |  | 0.08 |
| —CH₂CH₂— | —O—CH₃ | 0.31 |
| —CH₂CH₂— | —O—CH₂CH₃ | 0.31 |
| —CH₂CH₂— | —O—CH₂CH₂CH₂CH₃ | 0.16 |
| —CH₂CH₂— | —O—CH(CH₃)₂ | 0.31 |
| —CH₂CH₂— | —O—CH₂CH₂CH₂CH₂CH₃ | 0.08 |
| —CH₂CH₂— | —O—CH₂CH=CH₂ | 0.16 |
| —CH₂CH₂— | —O—⌕ | 0.63 |
| —CH₂CH₂— | —O—⬡ | 0.31 |
| —CH₂CH₂— | —O—⌕ | 0.31 |
| —CH₂CH₂— | —O—CH₂CH₂—O—CH₂CH₃ | 0.31 |
| —CH₂CH₂— | —O—CH₂CH₂—O—CH₂CH₂CH₃ | 0.63 |
| —CH₂CH₂— | —O—CH(CH₃)CH₂CH₃ | 0.16 |
| —CH₂CH₂CH₂— | —O—CH₃ | 0.08 |
| —CH₂CH₂CH₂— | —O—⌕ | 0.16 |
| —CH₂CH₂CH— | —O—⬡ | 0.16 |
| —CH₂CH₂CH₂— | —O—CH₂CH₂CH₃ | 0.16 |
| —CH₂CH₂CH₂— | —O—CH(CH₃)₂ | 0.16 |
| —CH₂CH₂CH₂— | —O—CH₂CH₂CH₂CH₃ | 0.31 |
| —CH₂CH₂CH₂— | —O—⌕ | 0.31 |
| —CH₂CH₂CH₂CH₂— | —O—CH₃ | 0.31 |
| —CH₂CH₂CH₂CH₂— | —O—CH₂CH₃ | 0.63 |
| —CH₂CH₂CH₂CH₂— | —O—CH₂CH₂CH₃ | 0.63 |
| —CH₂CH₂CH₂CH₂— | —O—CH(CH₃)₂ | 0.16 |
| —CH₂CH₂CH₂CH₂— | —O—CH₂CH₂CH₂CH₃ | 0.63 |
| —CH₂CH₂CH₂CH₂CH₃— | —O—CH₃ | 0.16 |
| —CH₂CH₂CH₂CH₂CH₃— | —O—CH(CH₃)₂ | 0.63 |
| —CH₂CH₂CH₂CH₂CH₃— | —O—CH₂CH₂CH₂CH₃ | 0.16 |
| —CH₂CH₂CH₂CH₂CH₃— | —O—(CH₃)₃ | 0.63 |
| —CH₂CH₂— | —O—phenyl | 0.16 |
| —CH₂CH₂— | —O—(p-fluorophenyl) | 0.31 |
| —CH₂CH₂— | —O—(m-chlorophenyl) | 0.31 |
| —CH₂CH₂— | —O—(p-chlorophenyl) | ≦0.63 |
| —CH₂CH₂— | —O—(p-bromophenyl) | 0.31 |
| —CH₂CH₂— | —O—(o-tolyl) | 0.31 |
| —CH₂CH₂— | —O—(m-tolyl) | 0.31 |
| —CH₂CH₂— | —O—(2,6-xylyl) | 0.63 |
| —CH₂CH₂— | —O—(o-methoxyphenyl) | ≦0.63 |
| —CH₂CH₂— | —O—(p-methoxyphenyl) | 0.63 |
| —CH₂CH₂— | —O—(1-naphthyl) | 0.63 |
| —CH₂CH₂— | —O—(2-naphthyl) | 0.63 |
| —CH₂CH₂CH₂— | —O—phenyl | 0.16 |
| —CH₂CH₂CH₂— | —O—(p-fluorophenyl) | 0.08 |
| —CH₂CH₂CH₂— | —O—(p-chlorophenyl) | 0.16 |
| —CH₂CH₂CH₂— | —O—(m-tolyl) | 0.31 |
| —CH₂CH₂CH₂— | —O—(p-tolyl) | 0.08 |
| —CH₂CH₂CH₂— | —O—(2,6-xylyl) | 0.63 |
| —CH₂CH₂CH₂— | —O—(m-methoxyphenyl) | 1.25 |
| —CH₂CH₂CH₂— | —O—(p-methoxyphenyl) | 0.16 |
| —CH₂CH₂CH₂— | —O—(1-naphthyl) | 0.63 |
| —CH₂CH₂CH₂— | —O—(2-naphthyl) | 0.16 |
| —CH₂CH₂CH₂CH₂— | —O—phenyl | 0.63 |

Anti-diarrheal activity is observed with the compounds of Formula I in the form of the free base or as an acid addition salt. The organic bases of Formula I may be converted to the corresponding therapeutically useful acid addition salts by conventional reaction with an appropriate inorganic acid, such as, for example, hydrochloric, hydrobromic, hydriodic, sulfuric, phosphoric and the like acids, or with an appropriate organic acid, such as, for example, acetic, propionic, glycolic, lactic, oxalic, malonic, tartaric, citric, sulfamic, ascorbic and the like acids. The organic bases of Formula III may likewise be converted to corresponding acid addition salts by reaction with such acids. In turn, the salts of Formulas I and III may be converted to the corresponding base form by conventional reaction with suitable alkali.

The preferred compounds of Formula I are those having the formulas:

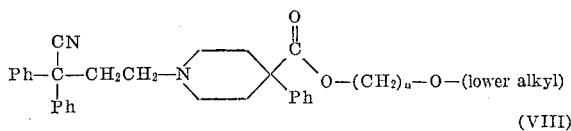

(VIII)

and

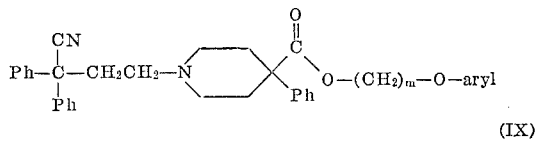

(IX)

and the therapeutically active acid addition salts thereof wherein Ph is phenyl, $n$ is an integer from 2 to 5, $m$ is an integer from 2 to 4, and aryl is a member selected from the group consisting of phenyl, halophenyl, tolyl, xylyl, methoxyphenyl and naphthyl, phenyl being most preferred.

Due to their inherent relationship to isonipecotic acid, the compounds of Formula I may be alternatively denoted as esters of 1-(3-cyano-3,3-diphenyl-propyl) 4-phenyl-isonipecotic acid; and compounds of Formula III as esters of 4-phenyl-isonipecotic acid.

The compounds of this invention and the methods for their preparation will appear more fully from a consideration of the following examples, which are given for the purpose of illustration only and are not to be construed as limiting the invention in spirit or in scope. In these examples, quantities unless otherwise stated are indicated as parts by weight.

EXAMPLE I

To a suspension of 87.5 parts of 1-benzyl-4-chlorocarbonyl-4-phenyl-piperidine hydrochloride in 560 parts of anhydrous toluene is added dropwise a solution of 57 parts of 2-methoxy-ethanol in 240 parts of anhydrous toluene. After the addition is complete, the whole is stirred and refluxed for 5 hours. The reaction mixture is filtered hot, and on cooling the filtrate to room temperature, a first crude fraction of about 30 parts of 1-benzyl-4-[(2-methoxy)-ethoxy-carbonyl] - 4 - phenyl - piperidine hydrochloride is obtained. The mother-liquor is concentrated to a volume of about 100 parts, whereupon a second crude fraction of about 11 parts is filtered off. Both crude crops are recrystallized from acetone, yielding 1-benzyl-4-[(2-methoxy)-ethoxy-carbonyl] - 4 - phenyl-piperidine hydrochloride; M.P. 186–188° C.

To a solution of 38.8 parts of 1-benzyl-4-[(2-methoxy)-ethoxy - carbonyl] - 4 - phenyl - piperidine hydrochloride in 200 parts of methanol is added a suspension of 7 parts of palladium-on-charcoal catalyst 10% in 8 parts of 2-propanol and the whole is hydrogenated at normal pressure and at room temperature. After the calculated amount of hydrogen is taken up, hydrogenation is stopped. The catalyst is filtered off and the filtrate is evaporated. The oily residue is crystallized from acetone, treated with activated charcoal, filtered off again and recrystallized once more from a mixture of acetone and methanol, yielding 4-[(2-methoxy)-ethoxy-carbonyl] - 4 - phenyl-piperidine hydrochloride; M.P. 131–134.5° C.

A mixture of 5.5 parts of 4-bromo-2,2-diphenyl-butyronitrile, 4.8 parts of 4-[(2-methoxy)-ethoxy-carbonyl]-4-phenyl piperidine hydrochloride, 3 parts of sodium carbonate, a few crystals of potassium iodide in 200 parts of 4-methyl-2-pentanone is stirred and refluxed for 65 hours. The reaction mixture is cooled and 50 parts of water are added. The organic layer is separated, dried, filtered and evaporated. The oily residue is dissolved in 240 parts of diisopropylether. This solution is filtered over activated charcoal and to the filtrate is added an excess of 2-propanol previously saturated with gaseous hydrogen chloride. The precipitated salt is filtered off and recrystallized from a mixture of acetone and diisopropylether, yielding 1-(3-cyano-3,3-diphenyl-propyl)-4 - (2-methoxyethoxycarbonyl)-4-phenyl-piperidine hydrochloride; M.P. 209–211.5° C.

EXAMPLE II

To a suspension of 116 parts of 1-benzyl-4-chlorocarbonyl-4-phenyl-piperidine hydrochloride in 600 parts of anhydrous toluene is added dropwise a solution of 90 parts of 2-ethoxy-ethanol in 200 parts of anhydrous toluene and the whole is stirred and refluxed for 5 minutes. The reaction mixture is filtered hot and the filtrate is evaporated. The residue is recrystallized twice: first from a mixture of acetone and diisopropylether and then from acetone, yielding 1-benzyl-4-[(2-ethoxy) - ethoxy - carbonyl] - 4 - phenyl-piperidine hydrochloride; M.P. 159–160° C.

To a solution of 42 parts of 1-benzyl-4-[(2-ethoxy)-ethoxy-carbonyl]-4-phenyl - piperidine hydrochloride in 200 parts of methanol is added a suspension of 7 parts of palladium-on-charcoal catalyst 10% in 8 parts of 2-propanol and the whole is hydrogenated at room temperature. After the calculated amount of hydrogen is taken up, hydrogenation is stopped. The catalyst is filtered off and the filtrate is evaporated. The residue is crystallized from a mixture of 160 parts of acetone and 16 parts of methanol and diisopropyl ether is added until turbid. The precipitated product is filtered off, yielding a first fraction of about 18 parts of 4-[(2-ethoxy)-ethoxy-carbonyl] - 4 - phenyl-piperidine hydrochloride; M.P. 118–169° C. (dec.). The mother-liquor is evaporated and the residue is crystallized from acetone, yielding a second fraction of about 5 parts of 4-[(2-ethoxy)-ethoxy - carbonyl]-4-phenyl-piperidine hydrochloride; M.P. 115.5–124° C.

A mixture of 6.6 parts of 4-bromo-2,2-diphenyl-butyronitrile, 6.3 parts of 4-[(2-ethoxy)-ethoxy-carbonyl] - 4-phenyl - piperidine hydrochloride, 5.3 parts of sodium carbonate, a few crystals of potassium iodide in 200 parts of 4-methyl-2-pentanone is stirred and refluxed for 65 hours. The whole is cooled and 50 parts of water are added. The organic layer is separated, dried, filtered and evaporated. The residue is dissolved in 320 parts of diisopropylether. This solution is filtered over activated charcoal and to the filtrate is added an excess of 2-propanol previously saturated with gaseous hydrogen chloride. The precipitated salt is filtered off and recrystallized from acetone, yielding 1-(3-cyano-3,3-diphenyl-propyl) - 4 - (2-ethoxy-ethoxycarbonyl) - 4 - phenyl-piperidine hydrochloride; M.P. 195.5–189° C.

EXAMPLE III

To a suspension of 74 parts of 1-benzyl-4-chloro-carbonyl-4-phenyl-piperidine hydrochloride in 600 parts of anhydrous toluene is added 88 parts of 2-butoxy-ethanol in 120 parts of anhydrous toluene and the whole is stirred and refluxed for 7 hours. The reaction mixture is filtered hot and the filtrate is evaporated. The residue is dissolved in acetone and the solvent is evaporated again. The oily residue is then dissolved in diisopropylether and during the evaporation of the latter solvent, the product crystallizes. The solid product is filtered off and dried, yielding a first fraction of about 27 parts of (2-butoxyethyl)-1-benzyl-4-phenyl-isonipecotate hydrochloride; M.P. 161–162° C. The mother-liquor is evaporated and a second fraction of about 12 parts of (2-butoxyethyl)-1-benzyl-4-phenyl-isonipecotate hydrochloride is obtained; M.P. 157.5–160° C.

To a solution of 38.9 parts of (2-butoxyethyl)-1-benzyl-4-phenyl-isonipecotate hydrochloride is added a suspension of 7 parts of palladium-on-charcoal catalyst 10% in 20 parts of 2-propanol and the whole is hydrogenated at normal pressure and at room temperature. After the calculated amount of hydrogen is taken up, hydrogenation is stopped. The catalyst is filtered off and the filtrate is evaporated. From the oily hydrochloride salt the free base is liberated in the usual manner with alkali. After extraction with diisopropylether, the extract is dried, filtered and evaporated. The oily residue is distilled, yielding (2-butoxyethyl)-4-phenyl-isonipecotate; B.P. 158–160° C. at 0.4 mm. pressure.

A mixture of 6.6 parts of 4-bromo-2,2-diphenyl-butyronitrile, 6.1 parts of (2-butoxyethyl)-4-phenyl-isonipecotate, 3.2 parts of sodium carbonate, a few crystals of potassium iodide in 200 parts of 4-methyl-2-pentanone is stirred and refluxed for 72 hours. The reaction mixture is cooled and 50 parts of water are added. The organic layer is separated, dried, filtered and evaporated. The residue is dissolved in 320 parts of diisopropylether. The solution is filtered over activated charcoal and to the clear filtrate is added an excess of 2-propanol previously saturated with gaseous hydrogen chloride. The precipitated solid salt is filtered off and recrystallized from a mixture of acetone and diisopropylether, yielding (2-butoxyethyl)-1-(3-cyano-3,3-diphenylpropyl)-4-phenyl-isonipecotate hydrochloride; M.P. 182–184° C.

EXAMPLE IV

A mixture of 85 parts of 1-benzyl-4-chlorocarbonyl-4-phenylpiperidine hydrochloride, 35 parts of 2-propoxyethanol and 720 parts of anhydrous toluene is stirred and refluxed for 3 hours. The reaction mixture is filtered hot and the filtrate is evaporated. The solid residue is recrystallized from a mixture of acetone and diisopropylether, yielding (2-propoxyethyl) 1-benzyl-4-phenylisonipecotate hydrochloride; M.P. ±140° C.

To a solution of 55.8 parts of (2-propoxyethyl) 1-benzyl-4-phenylisonipecotate hydrochloride in 240 parts of methanol is added a suspension of 8 parts of palladium-on-charcoal catalyst 10% in 20 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water. This aqueous solution is alkalized and the product is extracted with diisopropylether. The extract is dried, filtered and evaporated. The oily residue is distilled, yielding (2-propoxyethyl) 4-phenylisonipecotate; B.P. 153–155° C. at 0.2 mm. pressure.

A mixture of 6.6 parts of 4-bromo-2,2-diphenyl-butyronitrile, 5.8 parts of (2-propoxyethyl)-4-phenyl-isonipecotate, 3.2 parts of sodium carbonate, a few crystals of potassium iodide in 200 parts of 4-methyl-2-pentanone is stirred and refluxed for 72 hours. The reaction mixture is cooled and 50 parts of water are added. The organic layer is separated, dried, filtered and evaporated. The oily residue is dissolved in 320 parts of diisopropylether. This solution is filtered over activated charcoal and to the filtrate is added an excess of 2-propanol previously saturated with gaseous hydrogen chloride. The precipitated solid salt is filtered off and recrystallized twice: first from a mixture of acetone and diisopropylether and then from acetone only, yielding (2-propoxyethyl)-1-(3-cyano-3,3-diphenylpropyl)-4-phenylisonipecotate hydrochloride; M.P. 186.6–188.6° C.

EXAMPLE V

To a suspension of 87.5 parts of 1-benzyl-4-chlorocarbonyl-4-phenylpiperidine hydrochloride in 600 parts of anhydrous toluene is added a solution of 67.5 parts of 3-methoxy-propanol in 200 parts of anhydrous toluene and the whole is stirred at reflux temperature for 7 hours. The reaction mixture is filtered hot and the filtrate is evaporated. The solid residue is recrystallized from a mixture of acetone and diisopropylether, yielding (3-methoxypropyl) 1-benzyl-4-phenylisonipecotate hydrochloride; M.P. 158.5–164° C.

To a solution of 39.5 parts of (3-methoxypropyl) 1-benzyl-4-phenylisonipecotate hydrochloride in 200 parts of methanol is added a suspension of 7 parts of palladium-on-charcoal catalyst 10% in 16 parts of 2-propanol and the whole is hydrogenated at normal pressure and at room temperature. After the calculated amount of hydrogen is taken up, hydrogenation is stopped. The catalyst is filtered off and the filtrate is evaporated. The oily residue is dissolved in water and this aqueous solution is alkalized with sodium hydroxide solution. The product is extracted with diisopropylether. The extract is dried, filtered and evaporated. From the oily free base, the hydrochloride salt is prepared in the usual manner: an oily salt is precipitated. The whole is evaporated again. From the oily residue, the free base is liberated again and then the oxalate salt is prepared, yielding, after recrystallization from a mixture of methanol and acetone, (3-methoxypropyl) 4-phenylisonipecotate oxalate; M.P. 147–148° C.

A mixture of 5.4 parts of 4-bromo-2,2-diphenyl-butyronitrile, 5.5 parts of (3-methoxypropyl)-4-phenyl-isonipecotate oxalate, 4.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily residue is dissolved in 320 parts of diisopropylether. This solution is filtered over activated charcoal, and to the filtrate is added an excess of 2-propanol previously saturated with gaseous hydrogen chloride. The precipitated solid salt is filtered off and recrystallized from a mixture of acetone and diisopropylether, yielding (3-methoxypropyl) 1-(3-cyano-3,3-diphenylpropyl)-4-phenylisonipecotate hydrochloride; M.P. 193–197.4° C.

EXAMPLE VI

A mixture of 85 parts of 1-benzyl - 4 - chlorocarbonyl-4-phenylpiperidine hydrochloride, 35 parts of 2-isopropoxyethanol and 720 parts of anhydrous toluene is stirred and refluxed for 3 hours. The reaction mixture is filtered hot and the filtrate is evaporated. The residue is crystallized from a mixture of acetone and diisopropylether, yielding (2-isopropoxyethyl) 1-benzyl - 4 - phenylisonipecotate hydrochloride.

To a solution of 47.8 parts of (2-isopropoxyethyl) 1-benzyl - 4 - phenylisonipecotate hydrochloride in 200 parts of methanol is added a suspension of 7 parts of palladium-on-charcoal catalyst 10% in 20 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water; the free base is liberated and extracted with diisopropylether and 4-methyl-2-pentanone. The organic layer is dried, filtered and evaporated. The oily residue is distilled, yielding three fractions of (2-isopropoxyethyl) 4-phenylisonipecotate respectively: about 4 parts, B.P. 155–160° C. at 0.3 mm. pressure; a second fraction of about 12 parts, B.P. 160–163° C. at 0.3 mm. pressure; and finally about 5 parts, B.P. 163–168° C. at 0.3 mm. pressure.

A mixture of 6.6 parts of 4-bromo - 2,2 - diphenylbutyronitrile, 5.8 parts of (2-isopropoxyether) 4 - phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water is added. The organic layer is separated, dried, filtered and evaporated. The oily residue is dissolved in 320 parts of diisopropylether. This solution is filtered over activated charcoal and to the filtrate is added an excess of 2-propanol previously saturated with gaseous hydrogen chloride. The precipitated solid salt is filtered off and recrystallized twice; first from a mixture of acetone and diisopropylether and then from a mixture of 2-propanol and diisopropylether, yielding (2 - isopropoxyethyl) 1-(3-cyano-3,3-diphenylpropyl) - 4 - phenylisonipecotate hydrochloride; M.P. 165–166° C.

EXAMPLE VII

A mixture of 87.5 parts of 1-benzyl - 4 - chlorocarbonyl - 4 - phenylpiperidine hydrochloride, 76.5 parts of 2-(2 - tetrahydrofuryl) - methanol and 720 parts of anhydrous toluene is stirred and heated: after about 10 minutes a very exothermic reaction occurs and all solid material goes into solution. The whole is further stirred for 30 minutes at reflux temperature and the reaction mixture is filtered hot. The filtrate is evaporated and from the oily residue, the free base is liberated in the usual manner. After extraction with chloroform, the extract is dried, filtered and evaporated. The residue is dissolved in 320 parts of diisopropylether. This solution is filtered over activated charcoal and the filtrate is evaporated again, yielding about 52 parts of oily (2-tetrahydrofurylmethyl) 1-benzyl - 4 - phenylisonipecotate, which is used as such without further purification for the preparation of the next step.

To a solution of 51 parts of (2-tetrahydrofurylmethyl) 1-benzyl - 4 - phenylisonipecotate in 200 parts of methanol is added successively 14 parts of concentrated hydrochloric acid solution, followed by a suspension of 10 parts of palladium-on-charcoal catalyst 10% in 20 parts of 2-propanol and the whole is hydrogenated at normal pressure and at a temperature of 30° C. After the calculated amount of hydrogen is taken up, hydrogenation is stopped. The catalyst is filtered off and the filtrate is evaporated. The residue is dissolved in water and the free base is liberated in the usual manner. After extraction with 4-methyl-2-pentanone and dissopropylether, the combined extracts are dried, filtered and evaporated. The oily residue is distilled, yielding (2-tetrahydrofurylmethyl) 4-phenylisonipecotate; B.P. 175–177° C. at 0.6 mm. pressure.

A mixture of 6.6 parts of 4-bromo - 2,2 - diphenylbutyronitrile, 5.8 parts of (2-tetrahydrofurylmethyl) 4-phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The residue is dissolved in 320 parts of anhydrous diisopropylether and this solution is boiled. After filtration over activated charcoal, the hot filtrate is allowed to stand for 5 hours at room temperature. The solid precipitate is filtered off and dried, yielding (2 - tetrahydrofurylmethyl) 1-(3 - cyano-3,3-diphenylpropyl)-4-phenylisonipecotate; M.P. 101–104° C.

EXAMPLE VIII

A mixture of 87.5 parts of 1-benzyl - 4 - chlorocarbonyl-4-phenylpiperidine hydrochloride, 53 parts of 2-pentoxy - ethanol in 800 parts of anhydrous toluene is stirred and refluxed for 45 minutes. The reaction mixture is filtered hot and the filtrate is allowed to cool overnight. The precipitated product is filtered off and recrystallized from acetone, yielding (2-pentyloxyethyl) 1-benzyl - 4 - phenylisonipecotate hydrochloride; M.P. 188.5–190° C.

To a solution of 90 parts of (2-pentyloxyethyl) 1-benzyl - 4 - phenylisonipecotate hydrochloride in 320 parts of methanol is added a suspension of 10 parts of palladium-on-charcoal catalyst 10% in 40 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water. This solution is alkalized with sodium hydroxide solution and the product is extracted with diisopropylether. The extract is dried, filtered and evaporated. The oily residue is distilled, yielding a first fraction of about 3 parts of (2-pentyloxyethyl) 4-phenylisonipecotate; B.P. 175–178° C. at 0.6 mm. pressure, and a second fraction of about 42 parts of (2-pentyloxyethyl) 4-phenylisonipecotate; B.P. 178–180° C. at 0.6 mm. pressure.

A mixture of 6.6 parts of 4-bromo - 2,2 - diphenylbutyronitrile, 6.4 parts of (2-pentyloxyethyl) 4 - phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily residue is dissolved in 320 parts of anhydrous diisopropylether. This solution is filtered over activated charcoal and to the filtrate is added an excess of 2-propanol, previously saturated with gaseous hydrogen chloride. The precipitated solid salt is filtered off and recrystallized from a mixture of acetone and diisopropylether, yielding (2-pentyloxyethyl) 1-(3-cyano-3,3-diphenylpropyl) - 4 - phenylisonipecotate hydrochloride; M.P. 189–190° C.

EXAMPLE IX

A mixture of 52.5 parts of 1-benzyl-4-chlorocarbonyl-4-phenylpiperidine hydrochloride, 22.1 parts of 2-cyclopentyloxy-ethanol and 480 parts of anhydrous toluene is stirred and refluxed for 30 minutes. The solution is filtered hot and after keeping overnight at room temperature, the product is precipitated. It is filtered off and dried, yielding (2 - cyclopentyloxyethyl) 1-benzyl-4-phenylisonipecotate hydrochloride; M.P. 190.5–193° C.

To a solution of 59.3 parts of (2-cyclopentyloxyethyl) 1-benzyl-4-phenylisonipecotate hydrochloride in 240 parts of methanol is added a suspension of 8 parts of palladium-on-charcoal catalyst 10% in 24 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water. This aqueous solution is alkalized with sodium hydroxide solution and the product is extracted with diisopropylether and 4-methyl-2-pentanone. The extracts are dried, filtered and evaporated. The oily residue is distilled, yielding (2-cyclopentyloxyethyl) 4-phenylisonipecotate; B.P. 192–193° C. at 0.7 mm. pressure.

A mixture of 6.6 parts of 4-bromo-2,2-diphenylbutyronitrile, 6.4 parts of (2-cyclopentyloxyethyl) 4-phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily free base is dissolved in 320 parts of anhydrous diisopropylether and this solution is filtered over activated charcoal. To the filtrate is added an excess of 2-propanol previously saturated with gaseous hydrogen chloride. The precipitated solid salt is filtered off and recrystallized from a mixture of acetone and diisopropylether, yielding (2-cyclopentyloxyethyl) 1-(3-cyano-3,3-diphenylpropyl)-4-phenylisonipecotate hydrochloride; M.P. 192–193° C.

EXAMPLE X

A mixture of 81 parts of 1-benzyl-4-chlorocarbonyl-4-phenylpiperidine hydrochloride and 40 parts of 2-cyclohexyloxyethanol in 800 parts of anhydrous toluene is stirred and refluxed for 25 minutes. The reaction mixture is filtered hot and the filtrate is kept overnight at room temperature. The precipitated solid product is filtered off and recrystallized from acetone, yielding about 80 parts of (2-cyclohexyloxyethyl) 1-benzyl-4-phenylisonipecotate hydrochloride; M.P. 197–201° C.

To a solution of 87.5 parts of (2-cyclohexyloxyethyl) 1-benzyl-4-phenylisonipecotate hydrochloride in 360 parts of methanol is added a suspension of 12 parts of palladium-on-charcoal catalyst 10% in 40 parts of 2-propanol and the whole is hydrogenated at room temperature and at normal pressure. After the calculated amount of hydrogen is taken up, hydrogenation is stopped. The catalyst is filtered off and the filtrate is evaporated. The solid residue is recrystallized from a mixture of acetone and methanol and diisopropylether, yielding (2-cyclohexyloxyethyl) 4-phenylisonipecotate hydrochloride; M.P. 145–200° C. (dec.).

A mixture of 6.6 parts of 4-bromo-2,2-diphenylbutyronitrile, 7.4 parts of (2-cyclohexyloxyethyl) 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily residue is dissolved in 320 parts of diisopropylether. This solution is filtered over activated charcoal and to the filtrate is added an excess of 2-propanol previously saturated with gaseous hydrogen chloride. The precipitated crude, solid salt is filtered off and recrystallized from a mixture of acetone and diisopropylether, yielding (2-cyclohexyloxyethyl) 1-(3-cyano-3,3-diphenylpropyl) - 4 - phenylisonipecotate hydrochloride; M.P. 191–193° C.

EXAMPLE XI

To a sodium methoxide solution, prepared in the usual manner starting from 0.35 part of sodium in 3.2 parts of methanol, is added a suspension of 30.9 parts of methyl 1-benzyl-4-phenylisonipecotate in 20.1 parts of 2-(2-ethoxyethoxy)-ethanol. The whole is slowly distilled until no more methanol is obtained. After cooling, the residue is dissolved in diisopropylether and extracted with diluted hydrochloric acid solution. The acidic aqueous layer is alkalized with sodium hydroxide solution and extracted wth diisopropylether. The extract is dried, filtered and evaporated. The crude residue is dissolved in diisopropylether and to this solution is added an excess of 2-propanol previously saturated with gaseous hydrogen chloride. The crude solid salt is filtered off and recrystallized from a mixture of acetone and diisopropylether, yield [2-(2-ethoxyethoxy)-ethyl]1-benzyl-4-phenyl - isonipecotate hydrochloride; M.P. 123–124.5° C.

To a soultion of 13.2 parts of [2-(2-ethoxyethoxy)-ethyl]1-benzyl-4-phenylisonipecotate hydrochloride in 120 parts of methanol is added a suspension of 3 parts of palladium-on-charcoal catalyst 10% in 16 parts of 2-propanol and the whole is hydrogenated at normal pressure and at room temperature. After the calculated amount of hydrogen is taken up, hydrogenation is stopped. The catalyst is filtered off and the filtrate is evaporated, yielding [2-(2-ethoxyethoxy)-ethyl]4-phenylisonipecotate hydrochloride as an oily residue, which is used as such without further purification for the preparation of the next step.

A mixture of 9 parts of 4-bromo-2,2-diphenylbutyronitrile, 9.3 parts of [2-(2-ethoxyethoxy)-ethyl]4-phenylisonipecotate hydrochloride, 7.4 parts of sodium carbonate, a few crystals of potassium iodide in 240 parts of 4-methyl-2-pentanone is stirred and refluxed for 96 hours. The reaction mixture is cooled and 50 parts of water are added. The organic layer is separated, dried, filtered and evaporated. From the oily residue, the hydrochloride salt is prepared in the usual manner, yielding, after recrystallization from a mixture of acetone and diisopropylether, [2-(2-ethoxyethoxy)-ethyl]1-(3-cyano-3,3 - diphenylpropyl) - 4 - phenylisonipecotate hydrochloride; M.P. 169–170° C.

EXAMPLE XII

To a sodium ethoxide solution, prepared in the usual manner starting from 0.175 part of sodium in 2.3 parts of absolute denatured ethanol, is added a solution of 22.5 parts of ethyl 1-(3-cyano-3,3-diphenylpropyl)-4-phenylisonipecotate in 20.4 parts of 2-allyloxy-ethanol. The whole is distilled at room temperature. When 3.8 parts of absolute denatured ethanol are distilled over, the temperature rises to about 150° C. The whole is cooled and divided between water and diisopropylether. The organic layer is dried, filtered over activated charcoal and to the filtrate is added an excess of 2-propanol previously saturated with gaseous hydrogen chloride. The precipitated solid salt is filtered off and recrystallized three times: first twice from a mixture of acetone and diisopropylether and then from 4-methyl-2-pentanone, yielding (2-allyloxyethyl) 1-(3-cyano-3,3-diphenylpropyl)-4-phenylisonipecotate hydrochloride; M.P. 176–179° C.

EXAMPLE XIII

A mixture of 52.5 parts of 1-benzyl-4-chlorocarbonyl-4-phenylpiperidine hydrochloride, 26 parts of 3-cyclopentyloxypropanol and 480 parts of anhydrous toluene is stirred and refluxed for 35 minutes. The reaction mixture is filtered hot and on keeping the filtrate for 3 hours at room temperature, the product is precipitated. It is filtered off and dried, yielding about 55 parts of (3-cyclopentyloxypropyl) 1-benzyl-4-phenylisonipecotate hydrochloride; M.P. 169–171.5° C. The mother liquor is evaporated and, after recrystallization of the solid residue from acetone, a second fraction of about 5 parts of (3-cyclopentyloxypropyl) 1-benzyl-4-phenylisonipecotate hydrochloride; M.P. 164–172.5° C.

To a solution of 57.5 parts of (3-cyclopentyloxypropyl) 1-benzyl-4-phenylisonipecotate hydrochloride in 240 parts of methanol is added a suspension of 10 parts of palladium-on-charcoal catalyst 10% in 40 parts of 2-propanol and the whole is hydrogenated at normal pressure and at room temperature. After the calculated amount of hydrogen is taken up, hydrogenation is stopped. The catalyst is filtered off and the filtrate is evaporated. From the oily residue, the free base is liberated in the usual manner. After extraction with diisopropylether, the latter is dried, filtered and evaporated and the oily residue is distilled, yielding (3-cyclopentyloxypropyl) 4-phenylisonipecotate; B.P. 192° C. at 0.6 mm. pressure.

A mixture of 6.6 parts of 4-bromo-2,2-diphenylbutyronitrile, 6.6 parts of (3-cyclopentyloxypropyl) 4-phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The precipitated solid salt is filtered off and recrystallized twice from a mixture of acetone and diisopropylether, yielding (3-cyclopentyloxypropyl) 1 - (3 - cyano-3,3-diphenylpropyl)-4-phenylisonipecotate hydrochloride; M.P. 221–222° C.

EXAMPLE XIV

A mixture of 35 parts of 1-benzyl-4-chlorocarbonyl-4-phenylpiperidine hydrochloride, 20 parts of 3-cyclohexyloxypropanol and 360 parts of anhydrous toluene is stirred and refluxed for 35 minutes. The reaction mixture is filtered hot and after cooling the filtrate for 3 hours at 0° C., the precipitated product is filtered off and dried, yielding about 26 parts of (3-cyclohexyloxypropyl) 1-benzyl-4-phenylisonipecotate hydrochloride; M.P. 177–181.5° C. The mother-liquor is evaporated and the solid residue is recrystallized from acetone, yielding a second fraction of about 14 parts of (3-cyclohexyloxypropyl) 1-benzyl-4-phenylisonipecotate hydrochloride; M.P. 176–180.5° C.

To a solution of 39.3 parts of (3-cyclohexyloxypropyl) 1-benzyl-4-phenylisonipecotate hydrochloride in 200 parts of methanol is added a suspension of 7 parts of palladium-on-charcoal catalyst 10% in 20 parts of 2-propanol and the whole is hydrogenated at normal pressure and at room temperature. After the calculated amount of hydrogen is taken up, hydrogenation is stopped. The catalyst is filtered off and the filtrate is evaporated. The solid residue is recrystallized from acetone, yielding (3-cyclohexyloxypropyl) 4 - phenylisonipecotate hydrochloride; M.P. 116–120° C.

A mixture of 6.6 parts of 4-bromo-2,2-diphenylbutyronitrile, 7.6 parts of (3-cyclohexyloxypropyl) 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The solid salt is filtered off and recrystallized from a mixture of acetone and diisopropylether, yielding (3-cyclohexyloxypropyl) 1-(3 - cyano-3,3-diphenylpropyl)-4-phenylisonipecotate hydrochloride; M.P. 215–216° C.

EXAMPLE XV

A mixture of 70 parts of 1-benzyl-4-chlorocarbonyl-4-phenylpiperidine hydrochloride, 36 parts of 4-ethoxybutanol and 640 parts of anhydrous toluene is stirred and refluxed for 25 minutes. The reaction mixture is filtered and the filtrate is evaporated. The residue is dissolved in acetone and the solvent is evaporated again. The solid residue is triturated in diisopropylether and filtered off, yielding about 37 parts of (4-ethoxybutyl) 1-benzyl-4-phenylisonipecotate hydrochloride; M.P. 106–116° C.

To a solution of 36.5 parts of (4-ethoxybutyl) 1-benzyl-4-phenylisonipecotate hydrochloride in 160 parts of methanol is added a suspension of 6 parts of palladium-on-charcoal catalyst 10% in 20 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water. This aqueous phase is alkalized with sodium hydroxide solution and then saturated with potassium carbonate. The free base is extracted with diisopropylether. The extract is dried, filtered and evaporated. The oily residue is distilled, yielding (4-ethoxybutyl) 4-phenylisonipecotate; B.P. 169–172° C. at 0.6 mm. pressure.

A mixture of 6.6 parts of 4-bromo-2,2-diphenylbutyronitrile, 6.1 parts of (4-ethoxybutyl) 4-phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base the hydrochloride salt is prepared in the usual manner. The precipitated solid salt is filtered off and recrystallized from a mixture of acetone and diisopropylether. From this fraction the free base is liberated again. After extraction with chloroform, the extract is filtered and evaporated. The oily residue is chromatographed on a column of silicagel Merck No. 7734, using a mixture of one volume of chloroform and one volume of ethyl acetate, about 20 parts per hour. Fractions are collected each 1.5 hours. Fractions 3, 4, and 5 contain one product (determined by thin-layer-chromatography). These three fractions are combined and evaporated. From the residue, the hydrochloride salt is prepared and after recrystallization of the crude salt from a mixture of acetone and diisopropylether about 4 parts of (4-ethoxybutyl) 1-(3-cyano-3,3-diphenylpropyl)-4-phenylisonipecotate hydrochloride are obtained; M.P. 189–191° C.

EXAMPLE XVI

A mixture of 70 parts of 1-benzyl-4-chlorocarbonyl-4-phenylpiperidine hydrochloride, 40 parts of 5-ethoxypentanol, and 640 parts of anhydrous toluene is stirred and refluxed for 25 minutes. The reaction mixture is filtered hot and after cooling the filtrate to room temperature and standing for 2 hours, the product is precipitated. It is filtered off and recrystallized from a mixture of acetone and diisopropylether, yielding (5-ethoxypentyl) 1-benzyl-4-phenylisonipecotate hydrochloride; M.P. 154.5–168° C.

To a solution of 75.8 parts of (5-ethoxypentyl) 1-benzyl-4-phenylisonipecotate hydrochloride in 240 parts of methanol is added a suspension of 10 parts of palladium-on-charcoal catalyst 10% in 32 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water. This aqueous solution is alkalized with sodium hydroxide solution, saturated with potassium carbonate and the free base is extracted with diisopropylether. The extract is dried, filtered and evaporated. The only residue is distilled, yielding three fractions of (5-ethoxypentyl) 4-phenylisonipecotate: a first fraction of about 2 parts, B.P. 188–193° C. at 0.8 mm. pressure; a second fraction of about 33 parts, B.P. 193–195° C. at 0.8 mm. pressure; and a third fraction of about 3 parts, B.P. 195–197° C. at 0.8 mm. pressure.

A mixture of 6.6 parts of 4-bromo-2,2-diphenylbutyronitrile, 6.4 parts of (5-ethoxyphenyl) 4-phenylisonipecotate, 3.2 parts of sodium carbonate, a few crystals of potassium iodide in 200 parts of 4-methyl-2-pentanone is stirred and refluxed for 90 hours. The reaction mixture is cooled and 50 parts of water are added. The organic layer is prepared in the usual manner, yielding, after recrystallization from a mixture of acetone and diisopropylether, (5-ethoxypentyl) 1-(3-cyano-3,3-diphenylpropyl)-4-phenylisonipecotate hydrochloride; M.P. 182–184° C.

EXAMPLE XVII

A mixture of 20 parts of 1-benzyl-4-chlorocarbonyl-4-phenylpiperidine hydrochloride, 7 parts of 2-(2-tetrahydrofurylethanol) and 200 parts of anhydrous toluene is stirred and refluxed for 5 minutes. The reaction mixture is filtered hot and the filtrate is evaporated. The solid residue is triturated in 160 parts of diisopropylether and 16 parts of acetone, filtered off again, and dried, yielding 2-(2-tetrahydrofurylethyl) 1-benzyl-4-phenylisonipecotate hydrochloride; M.P. 139.5–160° C.

To a solution of 22.4 parts of 2-(2-tetrahydrofurylethyl) 1-benzyl-4-phenylisonipecotate hydrochloride in 120 parts of methanol is added a suspension of 5 parts of palladium-on-charcoal catalyst 10% in 16 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in 200 parts of water. This aqueous solution is washed with diisopropylether, alkalized with sodium hydroxide solution, saturated with potassium carbonate and the product is extracted three times with diisopropylether. The combined extracts are washed with water, dried, filtered and evaporated. The only residue is distilled, yielding 2 - (2 - tetrahydrofurylethyl) 4 - phenylisonipecotate; B.P. 167–170° C. at 0.1 mm. pressure.

A mixture of 10 parts of 4-bromo-2,2-diphenylbutyronitrile, 8.4 parts of 2-(2-tetrahydrofurylethyl) 4-phenylisonipecotate, 6.4 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The crude solid salt is filtered off and recrystallized twice from a mixture of acetone and diisopropylether, yielding 2 - (2 - tetrahydrofurylethyl) 1 - (3 - cyano - 3,3 - diphenylpropyl - 4 - phenylisonipecotate hydrochloride; M.P. 181.5–184° C.

EXAMPLE XVIII

A mixture of 11.9 parts of 1-benzyl-4-chlorocarbonyl-4-phenylpiperidine hydrochloride, 4.7 parts of 3-(2-tetrahydrofuryl)-propanol in 200 parts of anhydrous toluene is stirred and refluxed until all solid goes into solution (about 5 minutes). The reaction mixture is filtered hot and the filtrate is evaporated. The oily residue is dissolved in a mixture of 160 parts of diisopropylether and 16 parts of acetone: immediately the product is crystallized. It is filtered off and dried, yielding 3-(2-tetrahydrofurylpropyl) 1-benzyl-4-phenylisonipecotate hydrochloride; M.P. 134–140° C.

To a solution of 13.3 parts of 3-(2-tetrahydrofurylpropyl) 1-benzyl-4-phenylisonipecotate hydrochloride in 120 parts of methanol is added a suspension of 3 parts of palladium-on-charcoal catalyst 10% in 16 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in 50 parts of water. The aqueous solution is washed with diisopropylether, alkalized with sodium hydroxide solution, saturated with potassium carbonate and the free base is extracted three times with diisopropylether. The combined extracts are washed once with water, dried, filtered and evaporated, yielding 3-(2-tetrahydrofurylpropyl) 4-phenylisonipecotate; which is used as such without further purification for the preparation of the next step.

A mixture of 8.1 parts of 4-bromo-2,2-diphenylbutyronitrile, 7 parts of 3-(2-tetrahydrofurylpropyl)-4-phenyl-isonipecotate, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The residue is dissolved in 320 parts of diisopropylether. This solution is filtered over activated charcoal and to the filtrate is added an excess of 2-propanol previously saturated with gaseous hydrogen chloride. The precipitated solid salt is filtered off and recrystallized three times from a mixture of acetone and diisopropylether, yielding 3-(2-tetrahydrofurylpropyl) 1-(3-cyano - 3,3-diphenylpropyl)-4-phenylisonipecotate hydrochloride; M.P. 200–201° C.

EXAMPLE XIX

A mixture of 64 parts of 1-benzyl-4-chlorocarbonyl-4-phenylpiperidine hydrochloride, 48.6 parts of 2-(2-butoxyethoxy)-ethanol in 640 parts of anhydrous toluene is stirred and refluxed for 15 minutes. The reaction mixture is filtered hot and the filtrate is cooled to room temperature. The precipitated product is filtered off (filtrate is set aside) and crystallized from a mixture of acetone and diisopropylether, yielding a first less pure fraction of [2-(2-butoxy-ethoxy)-ethyl] 1-benzyl - 4-phenylisonipecotate hydrochloride; M.P. 153–170.5° C. The filtrate, which was set aside, is evaporated and the residue is crystallized from a mixture of acetone and diisopropylether, yielding a second fraction of pure [2-(2-butoxyethoxy)-ethyl] 1-benzyl - 4-phenylisonipecoate hydrochloride; M.P. 107–109° C. The combined acetone/diisopropylether-filtrates are evaporated and on keeping the oily residue at 0° C., a third fraction of [2-(2-butoxyethoxy)-ethyl] 1-benzyl-4-phenylisonipecotate hydrochloride is obtained; M.P. 97–115.5° C.

To a solution of 60 parts of [2-(2-butoxyethoxy)-ethyl] 1-benzyl-4-phenylisonipecotate hydrochloride in 240 parts of methanol is added a suspension of 10 parts of palladium-on-charcoal catalyst 10% in 24 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in water and this aqueous solution is washed with diisopropylether and then alkalized with sodium hydroxide solution. The free base is extracted with diisopropylether. The extract is dried, filtered and evaporated. The oily residue is distilled, yielding a first fraction of [2-(2-butoxyethoxy)-ethyl] 4-phenyl-isonipecotate; B.P. 193–205° C. at 0.6 mm. pressure; a second fraction of [2 - (2 - butoxyethoxy)-ethyl] 4-phenylisonipecotate; B.P. 205–207° C. at 0.6 mm. pressure and a third fraction of [2-(2-butoxyethoxy)-ethyl] 4-phenylisonipecotate; B.P. 207–209° C. at 0.6 mm. pressure.

A mixture of 9 parts 4-bromo-2,2-diphenylbutyronitrile, 9.4 parts of [2-(2-butoxyethoxy)-ethyl] 4-phenylisonipecotate, 5.3 parts of sodium carbonate, a few crystals of potassium iodide in 200 parts of 4-methyl-2-pentanone is stirred and refluxed for 90 hours. The reaction mixture cooled and 50 parts of water are added. The organic layer is separated, dried, filtered and evaporated. The residue is chromatographed on a Silicagel column (0.05-0.2 mm.) of 50 cm. height and 3 cm. diameter using a mixture of ethyl acetate and chloroform (3:1 by volume). The solution is evaporated and the residue is dissolved in 320 parts of diisopropylether. The solution is filtered over activated charcoal and to the filtrate is added 2-propanol previously saturated with gaseous hydrogen chloride. The precipitated solid salt is filtered off and recrystallized from a mixture of acetone and diisopropylether, yielding [2 - (2-butoxyethoxy)-ethyl] 1-(3-cyano - 3,3-diphenylpropyl) - 4 - phenylisonipecotate hydrochloride; M.P. 151.5–153° C.

EXAMPLE XX

The following lower alkyloxy-alkyl esters of 1-(3-cyano - 3,3-diphenyl-propyl)-4-phenyl-piperidine - 4-carboxylic acid are prepared in an analogous manner according to the foregoing examples and teachings herein:

$$\text{Ph}-\underset{\underset{\text{Ph}}{|}}{\overset{\overset{\text{CN}}{|}}{\text{C}}}-\text{CH}_2\text{CH}_2-\text{N}\underset{\text{Ph}}{\underbrace{\phantom{XXXXX}}}\overset{\text{O}}{\overset{\|}{\text{C}}}-\text{O}-\text{Alk}-\text{R}$$

| —Alk— | —R | M.P. (° C.) as HCl salt |
|---|---|---|
| —CH$_2$CH$_2$— | —O—CH(CH$_3$)CH$_2$CH$_3$ | 171–172.5 |
| —CH$_2$CH$_2$— | —O—CH$_2$CH(CH$_3$)$_2$ | 190–193 |
| —CH$_2$CH$_2$CH$_2$— | —O—CH$_2$CH$_3$ | 193–197 |
| —CH$_2$CH$_2$CH$_2$— | —O—CH$_2$CH$_2$CH$_3$ | 201–202.5 |
| —CH$_2$CH$_2$CH$_2$— | —O—CH(CH$_3$)$_2$ | 198–201 |
| —CH$_2$CH$_2$CH$_2$— | —O—CH$_2$CH$_2$CH$_2$CH$_3$ | 196.5–201.5 |
| —CH$_2$CH$_2$CH$_2$— | —O—CH$_2$CH$_2$CH$_2$CH$_2$CH$_3$ | 200–202.5 |
| —CH$_2$(CH$_2$)$_2$CH$_2$— | —O—CH$_3$ | 189–191 |
| —CH$_2$(CH$_2$)$_2$CH$_2$— | —O—CH$_2$CH$_2$CH$_3$ | 190–193 |
| —CH$_2$(CH$_2$)$_2$CH$_2$— | —O—CH(CH$_3$)$_2$ | 194–196 |
| —CH$_2$(CH$_2$)$_2$CH$_2$— | —O—CH$_2$CH$_2$CH$_2$CH$_3$ | 183–185.5 |
| —CH$_2$(CH$_2$)$_3$CH$_2$— | —O—CH$_3$ | 178–180 |
| —CH$_2$(CH$_2$)$_3$CH$_2$— | —O—CH(CH$_3$)$_2$ | 179.5–181 |
| —CH$_2$(CH$_2$)$_3$CH$_2$— | —O—CH$_2$CH$_2$CH$_2$CH$_3$ | 165–167 |
| —CH$_2$(CH$_2$)$_3$CH$_2$— | —O—CH(CH$_3$)CH$_2$CH$_3$ | 172–174 |
| —CH$_2$(CH$_2$)$_3$CH$_2$— | —O—C(CH$_3$)$_3$ | 176.5–179 |

EXAMPLE XXI

A mixture of 35 parts of 1-benzyl-4-chlorocarbonyl-4-phenylpiperidine hydrochloride, 15.2 parts of 2-phenoxyethanol and 320 parts of anhydrous toluene is stirred and refluxed until all solid goes into solution. The solution is filtered and the filtrate is kept at room temperature for 2 hours. The formed precipitate is filtered off and dried, yielding (2-phenoxyethyl) 1-benzyl-4-phenylisonipecotate hydrochloride; M.P. 209.5–213° C.

To 42 parts of (2-phenoxyethyl) 1-benzyl-4-phenylisonipecotate hydrochloride in 320 parts of methanol is added a suspension of 10 parts of palladium-on-charcoal catalyst 10% in 32 parts of 2-propanol and the whole is hydrogenated at normal pressure and at a temperature of about 30° C. After the calculated amount of hydrogen is taken up, hydrogenation is stopped. The catalyst is filtered off and the filtrate is evaporated. The semi-solid residue is crystallized from a mixture of 2-propanol and diisopropylether, yielding (2-phenoxyethyl) 4-phenylisonipecotate hydrochloride; M.P. 124–125° C.

A mixture of 8 parts of 4-bromo-2,2-diphenylbutyronitrile, 8 parts of (2-phenoxyethyl) 4-phenylisonipecotate hydrochloride, 7.6 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The residue is dissolved in 320 parts of anhydrous diisopropylether. The solution is filtered over hyflo and to the filtrate is added an excess of 2-propanol previously saturated with gaseous hydrogen chloride. The precipitated solid salt is filtered off and crystallized from a mixture of 200 parts of acetone and 20 parts of acetonitrile, yielding (2-phenoxyethyl) 1-(3-cyano-3,3-diphenylpropyl)-4-phenylisonipecotate hydrochloride; M.P. 208–210° C.

EXAMPLE XXII

By following the procedure of Example XXI, except that the 2-phenoxyethanol used therein is replaced with an equivalent amount of one of the following:

2-(o-tolyloxy)-1-ethanol;
3-phenoxy-1-propanol;
3-(o-methylphenoxy)-1-propanol; and
3-(2-naphthyloxy)-1-propanol;

There are obtained as respective products:

[2 - (o-tolyloxy)ethyl]1-(3-cyano-3,3-diphenylpropyl)-4-phenylisonipecotate hydrochloride, M.P. 182° C.;
3 - phenoxypropyl 1 - (3-cyano-3,3-diphenylpropyl)-4-phenylisonipecotate hydrochloride, M.P. 210–212.5° C.;
[3 - (o-tolyloxy)propyl]1-(3-cyano-3,3-diphenylpropyl)-4-phenylisonipecotate hydrochloride, M.P. 181.5° C.; and
[3 - (2 - naphthyloxy)propyl]1 - (3-cyano-3,3-diphenylpropyl) - 4-phenylisonipecotate hydrochloride, M.P. 192° C.

EXAMPLE XXIII

A mixture of 35 parts of 1-benzyl-4-chlorocarbonyl-4-phenylpiperidine hydrochloride, 18 parts of 2-(m-tolyloxy)-1-ethanol and 320 parts of anhydrous toluene is stirred and refluxed until all solid enters solution. The reaction mixture is filtered hot and the filtrate is kept at room temperature overnight. The precipitated solid product is filtered off and dried, yielding [2-(m-tolyloxy)ethyl]1 - benzyl-4-phenyl-isonipecotate hydrochloride; M.P. 197° C.

To a solution of 40.3 parts of [2-(m-tolyloxy)ethyl] 1-benzyl-4-phenylisonipecotate hydrochloride in 280 parts of methanol is added a suspension of 7 parts of palladium-on-charcoal catalyst 10% in 32 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in acetone. The undissolved material is filtered off and discarded. The filtrate is evaporated again. The residue is crystallized from a mixture of acetone and petroleum ether, yielding [2-(m-tolyloxy)ethyl]4-phenylisonipecotate hydrochloride; M.P. 118° C.

A mixture of 7 parts of 4-bromo-2,2-diphenylbutyronitrile, 7.5 parts of [2-(m-tolyloxy)ethyl]4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The residue is dissolved in 320 parts of anhydrous diisopropylether. The solution is filtered over activated charcoal and to the filtrate is added an excess of 2-propanol previously saturated with gaseous hydrogen chloride. The precipitated salt is filtered off and crystallized from a mixture of acetone and diisopropylether. The crude solid product is filtered off again and recrystallized from 80 parts of acetone, 1.6 parts of ethanol and a small amount of diisopropylether, yielding [2-(m-tolyloxy) - ethyl]1-(3-cyano-3,3-diphenylpropyl)-4-phenylisonipecotate hydrochloride; M.P. 205.5° C.

EXAMPLE XXIV

A mixture of 35 parts of 1-benzyl-4-chlorocarbonyl-4-phenylpiperidine hydrochloride, 18 parts of 2-(p-tolyloxy)-1-ethanol in 320 parts of anhydrous toluene is stirred and refluxed until all solid enters solution. The reaction mixture is filtered hot and the filtrate is kept at room temperature overnight. The formed precipitate is filtered off and dried, yielding [2-(p-tolyloxy)ethyl] 1 - benzyl-4-phenylisonipecotate hydrochloride; M.P. 190° C.

To a solution of 41 parts of [2-(p-tolyloxy)ethyl] 1-benzyl-4-phenylisonipecotate hydrochloride in 280 parts of methanol is added a suspension of 7 parts of palladium-on-charcoal catalyst 10% in 32 parts of 2-propanol and the whole is hydrogenated at normal pressure and at room temperature. After the calculated amount of hydrogen is taken up, hydrogenation is stopped. The catalyst is filtered off and the filtrate is evaporated. The residue is crystallized from a mixture of ethanol and diisopropylether, yielding [2 - (p - tolyloxy)ethyl]4-phenylisonipecotate hydrochloride; M.P. 136.5° C.

A mixture of 7 parts of 4-bromo-2,2-diphenylbutyronitrile, 7.5 parts of [2-(p-tolyloxy)ethyl]4-phenylisonipectate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily residue is dissolved in 320 parts of anhydrous diisopropylether. The solution is filtered over activated charcoal and to the filtrate is added an excess of 2-propanol previously saturated with gaseous hydrogen chloride. The precipitated solid salt is filtered off and recrystallized twice: first from a mixture of acetone (200 parts), 2-propanol (24 parts) and a small quantity of diisopropylether and further from a mixture of 80 parts of acetone, 2 parts of ethanol and a small quantity of diisopropylether, yielding [2 - (p-tolyloxy)ethyl]1-(3-cyano - 3,3-diphenylpropyl)-4-phenylisonipecotate hydrochloride; M.P. 218.5° C.

EXAMPLE XXV

A mixture of 35 parts of 1-benzyl-4-chlorocarbonyl-4-phenylpiperidine hydrochloride, 18.3 parts of 3-(m-tolyloxy)-propanol and 320 parts of anhydrous toluene is stirred at reflux temperature until all solid enters solution. The reaction mixture is filtered hot and on keeping the filtrate at room temperature, the solid product is precipitated. It is filtered off and dried, yielding a first fraction of [3 - (m-tolyloxy)-propyl] 1-benzyl-4-phenylisonipecotate hydrochloride; M.P. 155° C. The mother-liquor is evaporated and recrystallization of the crude solid residue from a mixture of acetone and diisopropylether, a second fraction of [3 - (m-tolyloxy)propyl] 1-benzyl-4-phenylisonipecotate hydrochloride is obtained; M.P. 156.5° C.

To a solution of 41.6 parts af [3-(m-tolyloxy)propyl] 1-benzyl - 4 - phenyl isonipecotate hydrochloride in 280 parts of methanol is added a suspension of 7 parts of palladium-on-charcoal catalyst 10% in 24 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in acetone. The undissolved material is discarded and the filtrate is evaporated again. The oily residue solidifies on standing for 2 weeks. The solid product is filtered off, triturated in diisopropylether, filtered off again and dried, yielding 25.3 parts of [3 - (m - tolyloxy)propyl] 4-phenylisonipecotate hydrochloride; M.P. 72° C.

A mixture of 7 parts of 4-bromo-2,2-diphenylbutyronitrile, 7.8 parts of [3-(m-tolyloxy)propyl] 4-phenylisonipecotate hydrochloride, 5,3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The precipitated solid salt is filtered off and recrystallized from a mixture of acetone and diisopropylether, yielding [3-(m-tolyloxy)propyl] 1-(3-cyano-3,3-diphenylpropyl)-4 - phenylisonipecotate hydrochloride; M.P. 178° C.

EXAMPLE XXVI

A mixture of 34 parts of 1-benzyl-4-chlorocarbonyl-4 - phenylpiperidine hydrochloride, 18.3 parts of 3-(p-methylphenoxy)-propanol and 320 parts of anhydrous toluene is stirred and refluxed for 5 minutes. The reaction mixture is filtered hot and on keeping the filtrate for 2 hours at room temperature and further for 3 hours at 0° C., the product is precipitated. It is filtered off, washed with acetone and dried, yielding a first fraction of [3-(p-tolyloxy)propyl] 1-benzyl-4-phenylisonipecotate hydrochloride; M.P. 146° C. The mother-liquor is concentrated to a volume of about 150 parts. On keeping this residue for 2 hours at room temperature, a second fraction of less pure [3-(p-tolyloxy)propyl] 1 - benzyl-4-phenylisonipecotate hydrochloride is obtained; M.P. 144.5° C.

To a solution of 34 parts of [3-(p-tolyloxy)propyl] 1-benzyl-4-phenylisonipecotate hydrochloride in 240 parts of methanol is added as suspension of 6 parts of palladium-on-charcoal catalyst 10% in 32 parts of methanol and the whole is hydrogenated at normal pressure and at room temperature. After the calculated amount of hydrogen is taken up, hydrogenation is stopped. The catalyst is filtered off and the filtrate is evaporated. The oily residue is crystallized from 2-propanol, yielding [3-(p-tolyloxy)propyl] 4-phenylisonipecotate hydrochloride; M.P. 142° C.

A mixture of 7 parts of 4-bromo-2,2-diphenylbutyronitrile, 7.8 parts of [3-(p-tolyloxy)propyl] 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layers is separated, dried, filtered and evaporated. The residue is dissolved in 320 parts of anhydrous diisopropylether. The solution is filtered over hyflo and to the filtrate is added an excess of 2-propanol previously saturated with gaseous hydrogen chloride. The precipitated solid salt is filtered off and recrystallized from a mixture of 160 parts of acetone and 32 parts of acetonitrile and diisopropylether (until turbid), yielding [3-(p - tolyloxy)propyl] 1 - (3 - cyano-3,3-diphenylpropyl) - 4 - phenylisonipecotate hydrochloride; M.P. 202° C.

EXAMPLE XXVII

A mixture of 35 parts of 1-benzyl-4-chlorocarbonyl-4-phenylpiperidine hydrochloride and 20 parts of 3-(2,6-xylyloxy)-1-propanol in 360 parts of anhydrous toluene is stirred and refluxed until all solid enters solution. The reaction mixture is filtered hot and the filtrate is kept for 3 hours at room temperature. The precipitated solid product is filtered off and dried, yielding [3-(2,6-xylyloxy)-propyl] 1 - benzyl-4-phenylisonipecotate hydrochloride; M.P. 186.5° C.

To a suspension of 42 parts of [3 - (2,6-xylyloxy)-propyl] 1 - benzyl-4 - phenylisonipecotate hydrochloride in 280 parts of methanol is added a suspension of 7 parts of pallladium-on-charcoal catalyst 10% in 32 parts of 2-propanol and the whole is hydrogenated at normal pressure and at a temperature of about 30° C. After the calclated amount of hydrogen is taken up, hydrogenation is stopped. The catalyst is filtered off and the filtrate is evaporated. The residue is dissolved in a mixture of acetone and diisopropylether. The undissolved material is discarded and the filtrate is evaporated again. The oily residue solidifies on standing and after recrystallization of the solid product from a mixture of 2-propanol and petroleum ether, [3 - (2,6-xylyloxy)propyl] 4-phenylisonipecotate hydrochloride is obtained; M.P. 123.5° C.

A mixture of 7 parts of 4-bromo-2,2-diphenylbutyronitrile, 8.1 parts of [3-(2,6-xylyloxy)propyl] 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The precipitated solid salt is filtered off and recrystallized from a mixture of acetone and 2-propanol (10:1 by volume), yielding [3 - (2,6 - xylyloxy)propyl] 1 - (3-cyano-3,3-diphenylpropyl) - 4 - phenylisonipecotate hydrochloride; M.P. 200° C.

EXAMPLE XXVIII

A mixture of 35 parts of 1-benzyl-4-chlorocarbonyl-4-phenylpiperidine hydrochloride, 20 parts of 3-(o-methoxyphenoxy)-1 - propanol in 320 parts of anhydrous toluene is stirred and refluxed until all solid enters solution. The reaction mixture is filtered hot and after keeping the filtrate for 3 hours at room temperature, the product is precipitated. It is filtered off and dried, yielding [3-(o-methoxyphenoxy)propyl] 1 - benzyl - 4 - phenylisonipecotate hydrochloride; M.P. 171° C.

To a solution of 41 parts of [3 - (o - methoxyphenoxy)-propyl] 1 - benzyl - 4 - phenylisonipecotate hydrochloride in 280 parts of methanol is added a suspension of 7 parts of palladium-on-charcoal catalyst 10% in 32 parts of 2-propanol and the whole is hydrogenated at normal pressure and at room temperature. After the calculated amount of hydrogen is taken up, hydrogenation is stopped. The catalyst is filtered off and the filtrate is evaporated. The residue is dissolved in a mixture of acetone and diisopropylether. The undissolved material is filtered off and the filtrate is evaporated again. The oily residue solidifies on standing. The product is filtered off, triturated in diisopropylether, filtered off again and dried, yielding [3-(o - methoxyphenoxy)propyl] 4 - phenylisonipecotate hydrochloride; M.P. 63° C.

A mixture of 7 parts of 4 - bromo - 2,2 - diphenylbutyronitrile, 8.1 parts of [3 - (o - methoxyphenoxy)propyl] 4 - phenyl isonipecotate hydrochloride, 5.3 parts of sodium carbonate, a few crystals of potassium iodide in 200 parts of 4 - methyl - 2 - pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The precipitated solid salt is filtered off and recrystallized from a mixture of acetone and diisopropylether, yielding [3 - (o - methoxyphenoxy)propyl] 1 - (3 - cyano-3,3 - diphenylpropyl) - 4 - phenylisonipecotate hydrochloride; M.P. 173° C.

EXAMPLE XXIX

The procedure of Example XXVIII is followed except that in place of the 3 - (o - methoxyphenoxy) - 1 - propanol used therein an equivalent amount of 3 - (m - methoxyphenoxy)-1-propanol and 3-(p-methoxyphenoxy)-1-propanol is employed to yield, as respective products:

[3 - (m - methoxyphenoxy)propyl] 1 - (3 - cyano - 3,3-diphenylpropyl) - 4 - phenyl - isonipecotate hydrochloride, M.P. 177° C.; and

[3 - (p - methoxyphenoxy)propyl] 1 - (3 - cyano - 3,3-diphenylpropyl) - 4 - phenyl - isonipecotate hydrochloride, M.P. 193° C.

EXAMPLE XXX

A mixture of 35 parts of 1 - benzyl - 4 - chlorocarbonyl-4 - phenylpiperidine hydrochloride, 25 parts of 3 - (1-naphthyloxy) - 1 - propanol and 560 parts of anhydrous toluene is stirred and refluxed until all solid enters solution. The reaction mixture is filtered hot and to the filtrate are added 16 parts of diisopropylether. After cooling to room temperature, the product is precipitated. It is filtered off and dried, yielding [3 - (1 - naphthyloxy)propyl] 1-benzyl-4-phenylisonipecotate hydrochloride; M.P. 166° C.

To a solution of 43.5 parts of [3 - (1 - naphthyloxy)propyl] 1 - benzyl - 4 - phenylisonipecotate hydrochloride in 280 parts of methanol is added a suspension of 7 parts of palladium-on-charcoal catalyst 10% in 28 parts of 2-propanol and the whole is hydrogenated at normal pressure and at a temperature of about 35° C. After the calculated amount of hydrogen is taken up, hydrogenation is stopped. The catalyst is filtered off and the filtrate is evaporated. The residue is crystallized from a mixture of ethanol and diisopropylether, yielding [3 - (1 - naphthyloxy)propyl] 4 - phenylisonipecotate hydrochloride; M.P. 148.5° C.

A mixture of 7 parts of 4 - bromo - 2,2 - diphenylbutyronitrile, 8.5 parts of [3-(1-naphthyloxy)propyl] 4-phenylisonipecotate hydrochloride, 5.3 parts of sodium carbonate, a few crystals of potassium iodide in 200 parts of 4-methyl - 2 - pentanone is stirred and refluxed for 90 hours. The reaction mixture is cooled and then 50 parts of water are added. The organic layer is separated, dried, filtered and evaporated. From the oily residue, the hydrochloride salt is prepared in the usual manner. The precipitated salt is filtered off and recrystallized twice from a mixture of acetone and diisopropylether, yielding a mixture of compounds. The fraction is converted into its free base in the conventional manner and chromatographed on a silicagel column, using a mixture of chloroform and methanol (95:5 by volume). The combined extracts (determined by thin-layer chromatography) are evaporated and from the residue again the hydrochloride salt is prepared. After recrystallization of the crude salt from a mixture of acetone and diisopropylether, [3 - (1 - naphthyloxy)propyl] 1 - (3 - cyano - 3,3 - diphenylpropyl) - 4 - phenylisonipecotate hydrochloride are obtained; M.P. 185° C.

EXAMPLE XXXI

A mixture of 34 parts of 1 - benzyl - 4 - chlorocarbonyl-4 - phenylpiperidine hydrochloride, 18.3 parts of 4 - phenoxybutanol in 320 parts of anhydrous toluene is stirred and refluxed for 5 minutes. The reaction mixture is filtered hot and on keeping the filtrate for 5 hours at room temperature, the product is precipitated. It is filtered off (filtrate is set aside), washed with acetone and dried, yielding a first fraction of (4 - phenoxybutyl) 1 - benzyl - 4 - phenylisonipecotate hydrochloride; M.P. 170.5° C. The filtrate is concentrated and a second less pure fraction of 4.5 parts of (4 - phenoxybutyl) 1 - benzyl - 4 - phenylisonipecotate hydrochloride is obtained; M.P. 151.5° C.

To a suspension of 40.3 parts of (4 - phenoxybutyl) 1-benzyl - 4 - phenylisonipecotate hydrochloride in 280 parts of methanol is added a suspension of 7 parts of palladium-on-charcoal catalyst 10% in 40 parts of 2-propanol and the whole is hydrogenated at normal pressure and at room temperature. After the calculated amount of hydrogen is taken up, hydrogenation is stopped. The catalyst is filtered off and the filtrate is evaporated. The oily residue solidifies in petroleumether. The solid product is filtered off and recrystallized from a mixture of 2-propanol and petroleumether, yielding (4 - phenoxybutyl) 4 - phenylisonipecotate hydrochloride; M.P. 95° C.

A mixture of 7 parts of 4-bromo-2,2-diphenylbutyronitrile, 7.8 parts of (4-phenoxybutyl) 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The residue is dissolved in 320 parts of diisopropylether (anhydrous). The solution is filtered over hyflo and to the filtrate is added an excess of 2-propanol previously saturated with gaseous hydrogen chloride. The precipitated solid salt is filtered off and then recrystallized from a mixture of acetone and diisopropylether, yielding (4-phenoxybutyl) 1-(3-cyano-3,3-diphenylpropyl)-4-phenylisonipecotate hydrochloride; M.P. 190° C.

EXAMPLE XXXII

A mixture of 26 parts of 4-chlorocarbonyl-4-phenylpiperidine hydrochloride, 17 parts of 2-(p-fluorophenoxy)-1-ethanol in 200 parts of anhydrous toluene is stirred and refluxed until all solid enters solution (gaseous hydrogen chloride is evolved). The reaction mixture is filtered hot and the filtrate is kept overnight at room temperature. The precipitated product is filtered off and dried, yielding [2-(p-fluorophenoxy)ethyl] 4 - phenylisonipecotate hydrochloride; M.P. 139.5° C.

A mixture of 6.6 parts of 4-bromo-2,2-diphenyl-butyronitrile, 7.6 parts of [2-(p-fluorophenoxy)ethyl] 4-phenylisonipecotate hydrochloride, 6.5 parts of sodium carbonate, a few crystals of potassium iodide in 200 parts of 4-methyl-2-pentanone is stirred and refluxed for 92 hours. The reaction mixture is cooled, filtered and the filtrate is evaporated. From the oily free base, the hydrochloride salt is prepared in the usual manner. The precipitated solid salt is filtered off and recrystallized from a mixture of ethanol and diisopropylether, yielding [2-(p-fluorophenoxy)ethyl] 1-(3-cyano-3,3-diphenylpropyl) - 4-phenylisonipecotate hydrochloride; M.P. 198° C.

EXAMPLE XXXIII

The procedure of Example XXXII is repeated except that the 2-(p-fluorophenoxy)-1-ethanol used therein is replaced with an equivalent quantity of 3-(p-chlorophenoxy)-1-propanol to yield as the corresponding product, 3-(p-chlorophenoxy)-propyl 1-(3-cyano - 3,3 - diphenylpropyl) - 4 - phenylisonipecotate hydrochloride, M.P. 191° C.

EXAMPLE XXXIV

A mixture of 26 parts of 4-chlorocarbonyl-4-phenylpiperidine hydrochloride, 19 parts of 2-(m-chlorophenoxy)-1-ethanol and 200 parts of anhydrous toluene is stirred and refluxed until all solid enters solution (gaseous hydrogen chloride is evolved). The reaction mixture is filtered and the filtrate is evaporated. The oily residue solidifies on scratching in diisopropylether. The solid product is filtered off and recrystallized from a mixture of ethanol and diisopropylether, yielding [2-(m-chlorophenoxy)ethyl] 4-phenylisonipecotate hydrochloride; M.P. 129.5° C.

A mixture of 6.6 parts of 4-bromo-2,2-diphenylbutyronitrile, 8 parts of [2-(m-chlorophenoxy)ethyl] 4-phenylisonipecotate hydrochloride, 6.5 parts of sodium carbonate, a few crystals of potassium iodide in 200 parts of 4-methyl-2-pentanone is stirred and refluxed for 92 hours. The reaction mixture is cooled, filtered and the filtrate is evaporated. From the oily free base, the hydrochloride salt is prepared in the usual manner, yielding, after recrystallization of the crude solid salt from a mixture of ethanol and diisopropylether, [2-(m-chlorophenoxy)ethyl] 1-(3-cyano-3,3-diphenylpropyl)-4 - phenylisonipecotate hydrochloride; M.P. 206° C.

EXAMPLE XXXV

By repeating Example XXXIV and substituting an equivalent amount of 2-(p-bromophenoxy)-1-ethanol for the starting alcohol used therein, the product obtained is [2-(p-bromophenoxy)ethyl]1-(3 - cyano - 3,3 - diphenylpropyl)-4-phenylisonipecotate hydrochloride; M.P. 225° C.

EXAMPLE XXXVI

A mixture of 26 parts of 4-chlorocarbonyl-4-phenylpiperidine hydrochloride, 19 parts of 2-(p-chlorophenoxy)-1-ethanol and 320 parts of anhydrous toluene is stirred and refluxed until the solid enters solution. The reaction mixture is filtered hot and the filtrate is evaporated. The residue is crystallized from a mixture of ethanol and diisopropylether, yielding [2-(p-chlorophenoxy)ethyl]4-phenylisonipecotate hydrochloride; M.P. 147.5° C.

A mixture of 7 parts of 4-bromo-2,2-diphenylbutyronitrile, 7.9 parts of [2-(p-chlorophenoxy)ethyl]4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. The oily residue is dissolved in 320 parts of anhydrous diisopropylether. The solution is filtered over activated charcoal and to the filtrate is added an excess of 2-propanol previously saturated with gaseous hydrogen chloride. The precipitated solid salt is filtered off and recrystallized from a mixture of acetone and diisopropylether, yielding [2-(p-chlorophenoxy)ethyl]1 - (3 - cyano-3,3-diphenylpropyl)-4-phenylisonipecotate hydrochloride; M.P. 208.5° C.

EXAMPLE XXXVII

By following the procedure of Example XXXVI, except that the 2-(p-chlorophenoxy)-1-ethanol used therein is replaced with an equivalent amount of one of the following:

2-(2,6-xylyloxy)-1-ethanol;
2-(o-methoxyphenoxy)-1-ethanol;
2-(p-methoxyphenoxy)-1-ethanol; and
2-(2-naphthyloxy)-1-ethanol;

there are obtained as respective products:

[2-(2,6-xylyloxy)ethyl]1-(3-cyano-3,3-diphenylpropyl)-4-phenylisonipecotate hydrochloride, M.P. 207° C.;
[2-(o-methoxyphenoxy)ethyl]1-(3-cyano-3,3-diphenylpropyl)-4-phenylisonipecotate hydrochloride, M.P. 160° C.;
[2-(p-methoxyphenoxy)ethyl]1-(3-cyano - 3,3 - diphenylpropyl)-4-phenylisonipecotate hydrochloride, M.P. 206° C.; and
[2-(2-naphthyloxy)ethyl]1-(3-cyano-3,3-diphenylpropyl)-4-phenylisonipecotate hydrochloride, M.P. 185.5° C.

EXAMPLE XXXVIII

A mixture of 26 parts of 4-chlorocarbonyl-4-phenylpiperidine hydrochloride, 18.5 parts of 2-(m-methoxyphenoxy)-1-ethanol in 240 parts of anhydrous toluene is stirred and refluxed for 15 minutes. The reaction mixture is filtered hot and the filtrate is evaporated. The residue is dissolved in water. The aqueous solution is alkalized with diluted sodium hydroxide solution and the free base is extracted with ether. The extract is dried, filtered and evaporated. From the oily free base, the oxalate salt is prepared in the conventional manner, yielding [2-(m-methoxyphenoxy)ethyl] 4-phenylisonipecotate oxalate; M.P. 145° C.

From 8.9 parts of [2 - (m - methoxyphenoxy)ethyl] 4-phenylisonipecotate oxalate, the free base is liberated in the conventional manner. After extraction with ether, the latter is dried and evaporated. The residue, together with 7 parts of 4-bromo-2,2-diphenylbutyronitrile, 5.3 parts of sodium carbonate, a few crystals of potassium iodide in 200 parts of 4-methyl-2-pentanone, is stirred and refluxed for 90 hours. The reaction mixture is cooled and 50 parts of water are added. The organic layer is separated, dried, filtered and evaporated. The residue is dissolved in 320 parts of anhydrous diisopropylether. The solution is filtered over hyflo and to the filtrate is added an excess of 2-propanol previously saturated with gaseous hydrogen chloride. The precipitated solid salt is filtered off and recrystallized from a mixture of acetone and diisopropylether, yielding [2-(m-methoxyphenoxy)ethyl] 1-(3-cyano - 3,3-diphenylpropyl)-4-phenylisonipecotate hydrochloride; M.P. 194.5° C.

EXAMPLE XXXIX

A mixture of 26 parts of 4-chlorocarbonyl-4-phenylpiperidine hydrochloride, 21 parts of 2-(1-naphthyl)ethanol and 320 parts of anhydrous toluene is stirred and refluxed until all solid enters solution. The reaction mixture is filtered hot and the filtrate is evaporated. The residue is crystallized from a mixture of ethanol and diisopropylether, yielding [2-(1-naphthyloxy)ethyl] 4-phenylisonipecotate hydrochloride; M.P. 174° C.

A mixture of 7 parts of 4-bromo-2,2-diphenylbutyronitrile, 8.2 parts of [2-(1-naphthyloxy)ethyl] 4-phenylisonipecotate hydrochloride, 5.3 parts of sodium carbonate, a few crystals of potassium iodide in 200 parts of 4-methyl-2-pentanone is stirred and refluxed for 90 hours. The reaction mixture is cooled and 50 parts of water are added. The organic layer is separated, dried, filtered and evaporated. From the oily free base, the hydrochloride salt is prepared in the usual manner. The crude solid salt is filtered off and recrystallized twice from a mixture of acetone and diisopropylether, yielding a mixture of compounds. The free base is liberated again in the conventional manner and chromatographed on a silicagel column, using a mixture of chloroform and methanol (95/5 by volume). The extracts (determined by thin-layer-chromatography) are evaporated. The residue is dissolved in anhydrous diisopropylether and to the solution is added an excess of 2-propanol previously saturated with gaseous hydrogen chloride. The precipitated salt is filtered off and recrystallized from a mixture of acetone and diisopropylether, yielding [2-(1-naphthyloxy)ethyl] 1-(3-cyano-3,3-diphenylpropyl) - 4 - phenylisonipecotate hydrochloride; M.P. 159° C.

EXAMPLE XL

A mixture of 26 parts of 4-chlorocarbonyl-4-phenylpiperidine hydrochloride, 19 parts of 3-(p-fluorophenoxy)-1-propanol in 160 parts of toluene is heated to reflux temperature while stirring. The whole is stirred at reflux until all solid enters solution (gaseous hydrogen chloride is evolved). The reaction mixture is then poured onto a vessel and diluted with petroleum ether. After standing at room temperature, the solid product is precipitated. It is filtered off and dried, yielding [3-(p-fluorophenoxy)propyl] 4 - phenylisonipecotate hydrochloride; M.P. 143° C.

A mixture of 6.6 parts of 4-bromo-2,2-diphenylbutyronitrile, 8 parts of [3-(p-fluorophenoxy)propyl] 4-phenylisonipecotate hydrochloride, 6.5 parts of sodium carbonate, a few crystals of potassium iodide in 200 parts of 4-methyl-2-pentanone is stirred and refluxed for 92 hours. The reaction mixture is filtered and the filtrate is evaporated. The oily residue is dissolved in diisopropylether and to this solution is added an excess of 2-propanol previously saturated with gaseous hydrogen chloride. The precipitated solid salt is filtered off and recrystallized from a mixture of ethanol and diisopropylether, yielding [3-(p-fluorophenoxy)propyl] 1-(3-cyano-3,3-diphenylpropyl)-4-phenylisonipecotate hydrochloride; M.P. 186° C.

EXAMPLE XLI

A mixture of 26 parts of 4-chlorocarbonyl-4-phenylpiperidine hydrochloride, 20.5 parts of 3-(m-chlorophenoxy)-1-propanol in 200 parts of anhydrous toluene is stirred and refluxed until all solid enters solution. The reaction mixture is filtered and the filtrate is evaporated. The oily residue solidifies slowly on scratching in diisopropylether. On standing overnight at room temperature, the whole is solidified. After recrystallization from 4 - methyl - 2 - pentanone, [3-(m-chlorophenoxy)propyl] 4-phenylisonipecotate hydrochloride is obtained; M.P. 103.5° C.

A mixture of 6.6 parts of 4-bromo-2,2-diphenylbutyronitrile, 8.2 parts of [3-(m-chlorophenoxy)propyl] 4-phenylisonipecotate hydrochloride, 6.5 parts of sodium carbonate, a few crystals of potassium iodide in 200 parts of 4-methyl-2-pentanone is stirred and refluxed for 92 hours. The reaction mixture is filtered and the filtrate is evaporated. From the oily free base, the hydrochloride salt is prepared in the usual manner. The precipitated solid salt is filtered off and recrystallized from a mixture of ethanol and diisopropylether, yielding [3-(m-chlorophenoxy) propyl] 1 - (3 - cyano-3,3-diphenylpropyl)-4-phenylisonipecotate hydrochloride; M.P. 179° C.

EXAMPLE XLII

A mixture of 26 parts of 4-chlorocarbonyl-4-phenylpiperidine hydrochloride, 25.4 parts of 3-(p-bromophenoxy)propanol in 200 parts of anhydrous toluene is stirred and refluxed until all solid enters solution. The reaction mixture is filtered and on the addition of petroleum ether to the filtrate, the product is precipitated. The oil is crystallized from ethyl acetate and diisopropylether, yielding (3 - p - bromophenoxy) 4-phenylisonipecotate hydrochloride; M.P. 120° C.

A mixture of 6.6 parts of 4-bromo-2,2-diphenylbutyronitrile, 9 parts of (3-p-bromophenoxypropyl) 4-phenylisonipecotate hydrochloride, 6.5 parts of sodium carbonate, a few crystals of potassium iodide in 200 parts of 4-methyl-2-pentanone is stirred and refluxed for 92 hours. The reaction mixture is filtered and the filtrate is evaporated. The oily residue is dissolved in diisopropylether. To this solution is added an excess of 2-propanol previously saturated with gaseous hydrogen chloride. The precipitated solid salt is filtered off and recrystallized from a mixture of ethanol and diisopropylether, yielding [3-(p-bromophenoxy)propyl] 1 - (3-cyano-3,3-diphenylpropyl)-4-phenylisonipecotate hydrochloride; M.P. 199° C.

What is claimed is:

1. A member selected from the group consisting of a 1-(3-cyano-3,3-diphenyl-propyl) - 4 - phenyl-piperidine-4-carboxylic acid ester having the formula:

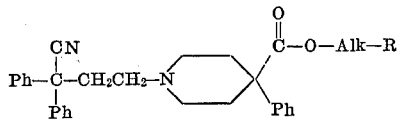

and the therapeutically active acid addition salts thereof wherein Ph is phenyl, Alk is an alkylene chain of from 1 to 5 carbons, and R is a member selected from the group consisting of lower alkyloxy, allyloxy, butenyloxy, methallyloxy, pentenyloxy, lower alkyloxy-lower alkyloxy, cyclopentyloxy, cyclohexyloxy, tetrahydrofuryl, phenoxy, halophenoxy, tolyloxy, xylyloxy, lower alkoxyphenoxy and naphthyloxy.

2. A member selected from the group consisting of a 1-(3-cyano-3,3-diphenyl-propyl) - 4 - phenyl-piperidine-4-carboxylic acid ester having the formula:

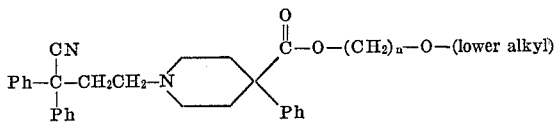

and the therapeutically active acid addition salts thereof wherein Ph is phenyl and $n$ is an integer from 2 to 5.

3. A member selected from the group consisting of a 1-(3-cyano-3,3-diphenyl-propyl) - 4 - phenyl-piperidine-4-carboxylic acid ester having the formula:

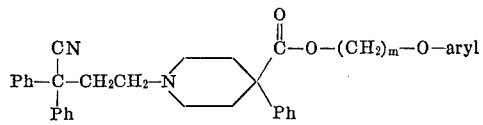

and the therapeutically active acid addition salts thereof wherein Ph is phenyl, $m$ is an integer from 2 to 4, and aryl is a member selected from the group consisting of phenyl, halophenyl, tolyl, xylyl, methoxyphenyl and naphthyl.

4. A member selected from the group consisting of 1-(3-cyano-3,3-diphenyl-propyl) - 4 - phenyl-piperidine-4-carboxylic acid ester having the formula:

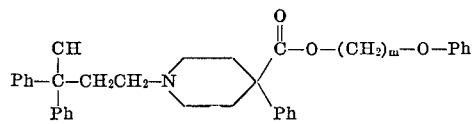

and the therapeutically active acid addition salts thereof wherein Ph is phenyl and $m$ is an integer from 2 to 4.

5. The compounds of claim 1 which is 2-phenoxyethyl 1-(3-cyano-3,3-diphenyl-propyl) - 4 - phenyl-piperidine-4-carboxylate.

6. The compounds of claim 1 which is the hydrohalide salt of 2-phenoxyethyl 1-(3-cyano-3,3-diphenyl-propyl)-4-phenyl-piperidine-4-carboxylate.

7. A member selected from the group consisting of a 4-phenyl-piperidine-4-carboxylic acid ester having the formula:

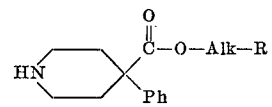

and the acid addition salts thereof wherein Ph is phenyl, Alk is an alkylene chain of from 1 to 5 carbon atoms, and R is a member selected from the group consisting of lower alkyloxy, allyloxy, butenyloxy, methallyloxy, pentenyloxy, lower alkyloxy-lower alkyloxy, cyclopentyloxy, cyclohexyloxy, tetrahydrofuryl, phenoxy, halophenoxy, tolyloxy, xylyloxy, lower alkoxyphenoxy and naphthyloxy.

8. The compound of claim 7 having the formula:

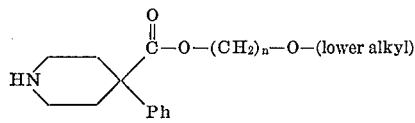

wherein Ph is phenyl and $n$ is an integer from 2 to 5.

9. The compound of claim 7 having the formula:

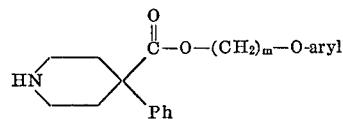

wherein Ph is phenyl, $m$ is an integer from 2 to 4, and aryl is a member selected from the group consisting of phenyl, halophenyl, tolyl, xylyl, methoxyphenyl and naphthyl.
10. The compound of claim 7 having the formula:
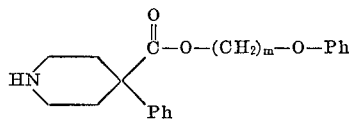
wherein Ph is phenyl and $m$ is an integer from 2 to 4.
11. The compound of claim 7 which is 2-phenoxy-ethyl 4-phenyl-piperidine-4-carboxylate hydrochloride.
References Cited
UNITED STATES PATENTS
2,898,340   8/1959   Janssen _____ 260—294.3
HENRY R. JILES, Primary Examiner
G. T. TODD, Assistant Examiner
U.S. Cl. X.R.
260—293.4, 294, 465; 424—267

PO-1050
(5/69)

UNITED STATES PATENT OFFICE
CERTIFICATE OF CORRECTION

Patent No. 3,539,579      Dated November 10, 1970

Inventor(s) Paul Adrian Jan Janssen

It is certified that error appears in the above-identified patent and that said Letters Patent are hereby corrected as shown below:

In Column 4, line 45, "-CH$_2$CH$_2$CH-" should read -- -CH$_2$CH$_2$CH$_2$-
In Column 6, line 67, "195.5" should read --185.5--. In Column 14, line 69, "only" should read --oily--. In Column 15 line 8, insert parenthesis after diphenylpropyl. In Column 16 line 20, insert --of-- after "parts". Same Column, line 24, insert --is-- after "mixture". In Column 17, lines 35, 40, and 43, delete the brackets. In Column 18, line 63, insert --after-- before "recrystallization". In Column 21, lines 3 and 6, delete the brackets. In Column 23, lines 5, 45, 47, 50 and 53, delete the brackets. In Claim 4, that portion of the reading $\underset{|}{\overset{|}{-C-}}$ CH should read $\underset{|}{\overset{|}{-C-}}$ CN . In Claim 11, line 1, delete "the compound of Claim 7 which is".

SIGNED AND SEALED

JAN 26 1971

(SEAL)
Attest:

Edward M. Fletcher, Jr.
Attesting Officer

WILLIAM E. SCHUYLER,
Commissioner of Pat